United States Patent [19]

Masclet et al.

[11] 4,082,255
[45] Apr. 4, 1978

[54] OLEO-PNEUMATIC DAMPER

[75] Inventors: Jean Masclet, Paris; Jacques Veaux, Chatillon sur Bagneau, both of France

[73] Assignee: Messier-Hispano S.A., Montrouge, France

[21] Appl. No.: 759,017

[22] Filed: Jan. 13, 1977

[30] Foreign Application Priority Data

Jan. 15, 1976 France .................................. 76 01015

[51] Int. Cl.² .............................................. F16F 9/06
[52] U.S. Cl. .................................... 267/64 R; 188/269
[58] Field of Search ...................... 267/34, 64 R, 64 B, 267/118, 124; 188/269, 282, 284, 297, 311, 313–316

[56] References Cited

U.S. PATENT DOCUMENTS

| 2,559,967 | 7/1951 | Katz ...................................... 267/64 R |
| 2,564,790 | 8/1951 | Orloff et al. ........................... 267/64 R |
| 2,916,283 | 12/1959 | Westcott ............................. 267/64 R |
| 3,056,598 | 10/1962 | Conway et al. ..................... 267/64 R |
| 3,445,103 | 5/1969 | Hennells ............................. 267/64 R |
| 3,724,832 | 4/1973 | Ceska .................................. 267/64 R |

Primary Examiner—Johnny D. Cherry
Attorney, Agent, or Firm—Scully, Scott, Murphy & Presser

[57] ABSTRACT

An oleo-pneumatic damper comprises a hollow rod slidable within a cylinder, and a low-pressure gas chamber defined within the cylinder adjacent to a first variable volume of hydraulic fluid, which volume is essentially provided in the hollow rod. A second variable volume of hydraulic fluid in the rod is separated from the first fluid volume by a valve device, and a separating piston separates the second fluid volume from a high-pressure gas chamber, also in the hollow rod. A spring in the first fluid volume urges the hollow rod into the cylinder, thereby to form an anti-threshold spring to reduce the threshold or minimum loading on the damper, at which the damper will commence a compression stroke movement for damping purposes.

6 Claims, 4 Drawing Figures

OLEO-PNEUMATIC DAMPER

BACKGROUND OF THE INVENTION

Oleo-pneumatic dampers are known, of the type comprising first and second air chambers, the first chamber being a low-pressure chamber and the second being a high-pressure chamber, for example in aircraft undercarriage trains. Such a damper is provided with two separating pistons, and the development of the load in dependence on the travel in the compression movement of the damper follows a curve, referred to as the polytrope of the damper, having two portions which are separated by a deflection point and each of which represents a rising function. Thus, the first portion of the curve corresponds to the rise in pressure in the low-pressure chamber under the effect of displacement of one of the separating pistons, resulting from the loading applied to the damper. When the pressure in the low-pressure chamber has reached the level of the pressure in the high-pressure chamber, the load development follows the second portion of the curve, corresponding to the rise in pressure in the two chambers under the effect of the displacement of the two separating pistons, resulting from the continuing loading being applied to the damper.

However, the use of such dampers on aircraft with rotating aerofoils, for example helicopters, has shown that the relatively low-frequency operating vibrations developed by such rotating aerofoils when the aircraft is still on the ground can give rise to ground resonance phenomena which may be particularly dangerous when the aircraft is at the limit of lift, since such phenomena can result in a loss of stability of the aircraft, and the aircraft can suffer damage or even destruction as a result. A substantial cause of the known dampers being unsuited for use on aircraft with rotary aerofoils, which are subjected to ground resonance phenomena, is the existance of an non-negligible damper loading threshold, before a compression stroke movement of the damper occurs.

In addition, the above-mentioned dampers have been optimized either for operation at a low speed of compression movement of the damper, as occurs for example when an aircraft is taxiing on the ground, or for operation at a high compression speed, as occurs when an aircraft lands, at the moment of touching down on the ground, at a substantial vertical speed.

SUMMARY OF THE INVENTION

An object of the present invention is to provide an oleo-pneumatic damper capable of maintaining a good level of stability for an aircraft on which it is fitted, whether it is subjected to vibratory forces at relatively low frequencies caused by a rotating aerofoil, or vibratory forces at relatively higher frequencies caused by the aircraft rolling along the ground.

Another object of the invention is to provide a damper capable of good levels of performance both for low and for high speeds of compression movement.

To meet these and other objects, the oleo-pneumatic damper of the invention has a double air chamber, one of which is a low-pressure chamber and the other of which is a high-pressure chamber, and comprises a cylinder and a hollow rod capable of sliding within the cylinder. The low-pressure chamber is provided in the interior of the cylinder and is adjacent to a first variable volume, which is essentially disposed in the hollow rod, of a hydraulic fluid reserve, with a second variable volume which is separated from the first variable volume by a valve device and which is disposed in the hollow rod. The high-pressure chamber is also provided in the hollow rod, and a resilient means is disposed in said first volume of hydraulic fluid, tending to cause the hollow rod to be driven into the cylinder, thus forming an anti-threshold spring which has the effect of reducing the minimum value of loading on the damper, at which a compression stroke movement of the damper occurs.

In order to provide for damper operation adapted to high speeds of compression stroke movement, such as those encountered when an aircraft lands, and also for low speeds encountered when an aircraft is rolling on the ground, it is necessary to povide for the passage of hydraulic fluid from the first volume to the low-pressure chamber and/or to the second volume respectively through a large orifice or a small orifice. For this purpose, the valve device of the damper advantageously comprises a valve which is controlled by the speed at which the hollow rod is driven into the cylinder, permitting hydraulic fluid to pass through a small retarding orifice at low speeds of rod movement and through a supplementary retarding orifice which is opened by the valve at high speeds of rod movement.

In a preferred embodiment of the damper, the valve comprises a distribution slide valve with an inlet orifice and an outlet orifice, in which a piston, engaged by a resilient means, closes one of said orifices at low speeds of movement of the hollow rod into the cylinder, and opens said orifice at high speeds of rod movement, the valve opening against the force of the resilient means under the effect of a pressure difference due to the pressure drop caused by the hydraulic fluid passing through a metering or throttle orifice.

For the purposes of simplification, in one embodiment of the damper, the low-pressure chamber and the said hydraulic fluid reserve volumes co-operate with the high-pressure chamber by way of a single separating piston disposed between the high-pressure chamber and the said second volume of hydraulic fluid.

In order to extend the operational life of such a damper, in particular by avoiding the effects of an abrupt end to the damper expansion or extension movement, as when the damper has been relieved of load virtually instantaneously, a sleeve may be disposed in the first volume of hydraulic fluid, the sleeve being fixed with respect to the hollow rod therewithin and having a head capable of engaging by a sliding movement into the low-pressure chamber. Radial apertures are provided adjacent to the head of said sleeve and are arranged at positions axially of the sleeve such that some of said apertures are closed by a shoulder, which is fixed with respect to the cylinder, towards the end of the damper expansion movement, so as to cause a deceleration action at the end of the expansion movement.

Mention should also be made of the fact that, when a damper as described herein is used on an aircraft undercarriage train, because of the developments of such aircraft and such undercarriage trains relative to the aircraft, it frequently occurs that the damper is in an inclined position. The air in the low-pressure chamber may then penetrate into the space occupied by the hydraulic fluid when the damper is in the operating position, that is to say, substantially vertical, the low-pressure chamber being positioned at the upper end of the damper. To at least reduce this disadvantage, in one embodiment of the damper axial grooves or notches may be provided in the external surface of the above-mentioned sleeve, in the vicinity of the head of the sleeve; the grooves may co-operate with the above-mentioned shoulder (being the shoulder which closes the radial apertures in the sleeve), to define lateral transfer passages permitting the air to rise back into the low-pressure chamber and the hydraulic fluid to return to cover the different orifices and apertures when the damper, after having been inclined, is again set in a substantially vertical position, with the low-pressure chamber at the top.

DESCRIPTION OF THE PREFERRED EMBODIMENT

Figure 1:
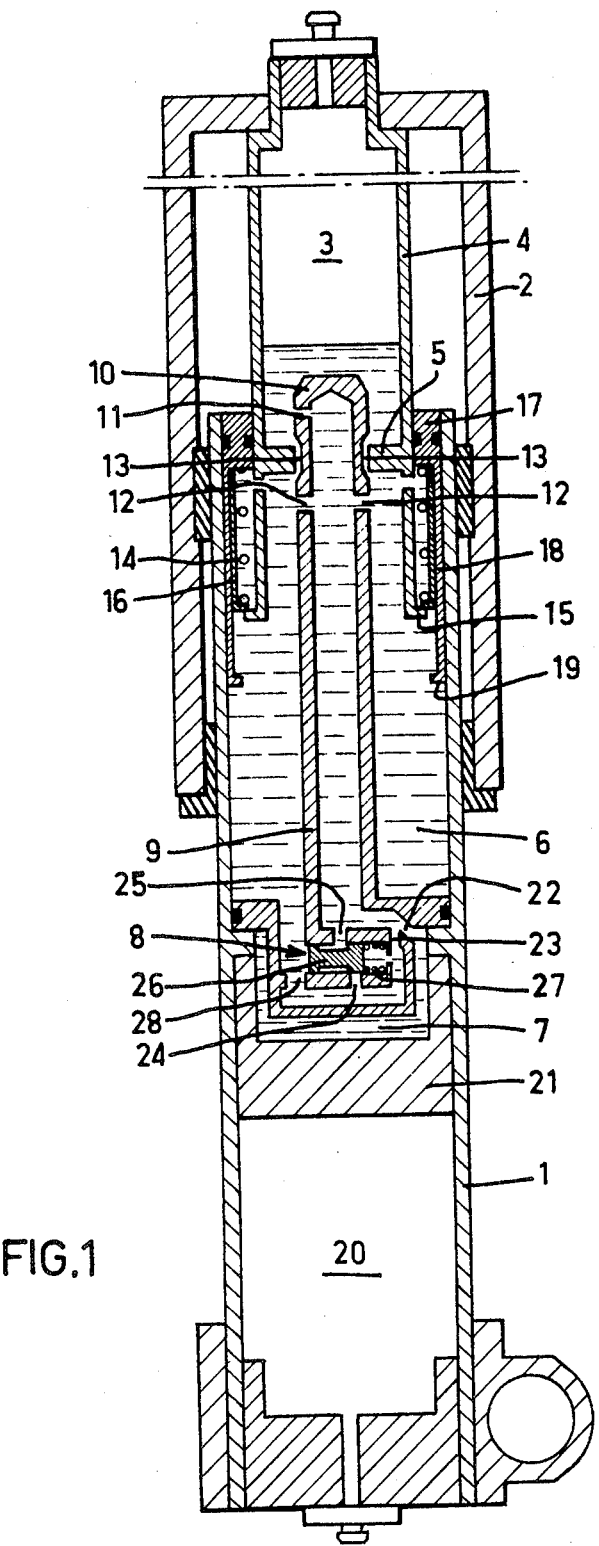
FIG. 1 shows a view in axial section of a damper according to the present invention.
Figure 2:
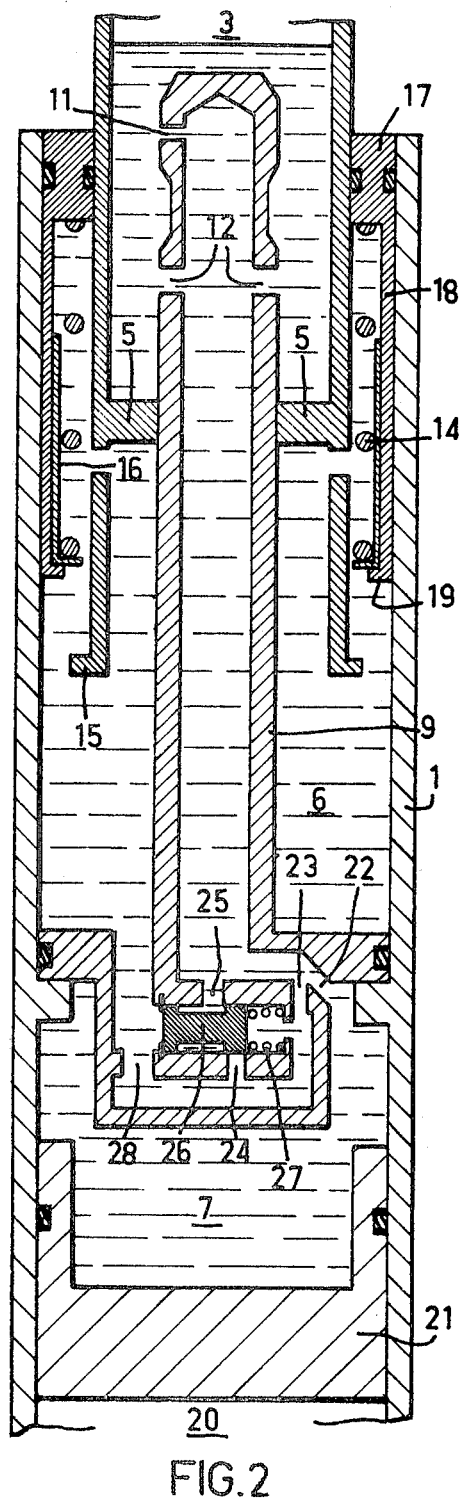
FIGS. 2 and 3 show views also in section of the central part of the damper shown in FIG. 1, respectively under load and during a deceleration phase at the end of expansion or extension of the damper.
Figure 3:
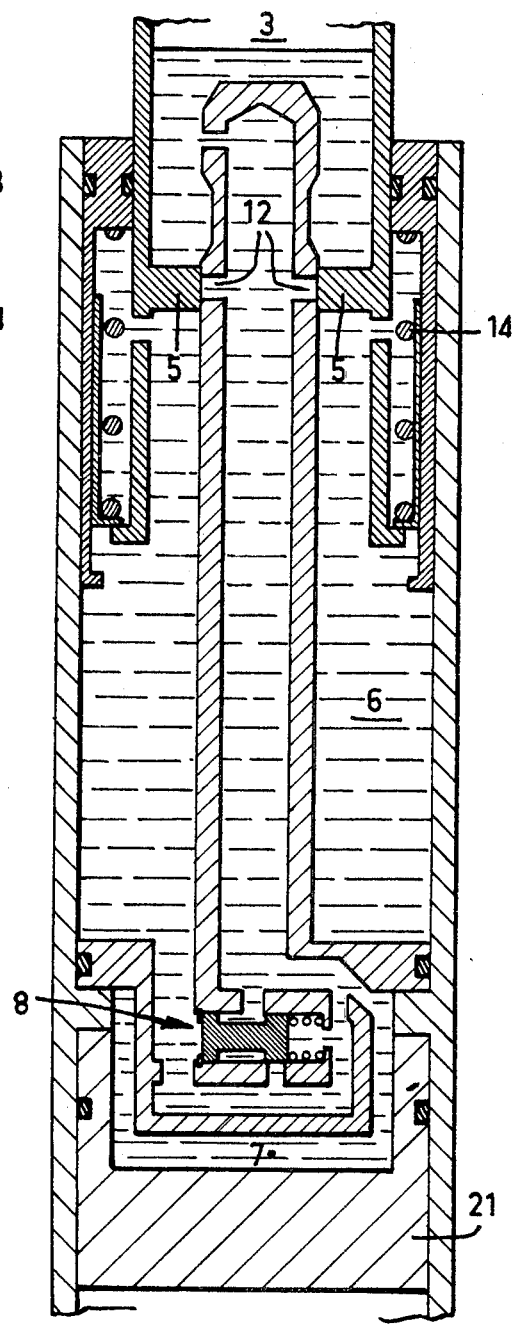

Referring to FIGS. 1, 2 and 3 in which the same references denote the same components, an oleo-pneumatic damper comprises a hollow rod 1 which in use is connected to a component such as a member of an aircraft undercarriage train which carries the undercarriage wheel or wheels. The rod 1 is capable of sliding sealingly in the interior of a cylinder 2 connected to another structure, for example another member of the undercarriage train.

A low-pressure gas such as air chamber 3 is defined in the interior of the cylinder 2 in the upper part thereof, by means of a sheath 4 which is fixed with respect to the cylinder 2 and extends axially therwithin. The sheath 4 is provided with an annular internal shoulder 5 and an annular external shoulder 15.

A hydraulic fluid reserve, occupying first and second variable-volume chambers 6 and 7, is disposed within the hollow rod 1 and partially fills the space (chamber 3) defined by the sheath 4 and the shoulder 5, in such a way that the low-pressure chamber 3 is directly adjacent to the surface of the hydraulic fluid.

The variable-volume chambers 6 and 7 are separated from each other by a valve device 8 which is disposed at the corresponding end of a sleeve 9, i.e. the end remote from the chamber 3. The sleeve 9 extends axially in the hollow rod 1 and is fixed relative thereto. It will be seen that the sleeve 9 extends through the chamber 6 and into the sheath 4. The other or upper end 10 of the sleeve 9 forms a head which engages slidably into the chamber 3.

An aperture 11 of small diameter and two apertures 12 of larger diameter are provided in the wall of the sleeve 9, adjacent to the head end 10 thereof. Axial notches or grooves are also provided in the external surface of the sleeve 9, between the apertures 11 and 12, and are co-operable with the shoulder 5 to define lateral transfer passages 13.

A resilient means in the form of a coil spring 14 disposed around the sleeve 4 bears at one end against a shoulder of a tubular element 16 and at the other end against a shoulder 17 of a second tubular element 18 which encircles the element 16 and which is fixed with respect to the hollow rod 1. The lower end of the tubular element 16 bears against the external shoulder 15 of the sheath 4, and thus the spring 14 tends to cause the hollow rod 1 to be driven inwardly of the cylinder 2 with the shoulder 17 sliding along the sheath 4. When the movement of the hollow rod 1 into the cylinder 2 is greater than that determined by the possible elongation of the spring 14, the spring 14 is entrained with the hollow rod 1, by a second shoulder 19 on the tubular element 18 bearing against the shoulder at the lower end of the element 16, causing the element 16 to be entrained into the cylinder 2 with the rod 1. The spring 14 thus has what might be termed an "anti-threshold" action by reducing the threshold or minimum loading on the damper, at which the damper will commence a compression stroke movement.

The damper also has a high-pressure gas chamber 20, which is disposed adjacent to but separated from the second variable-volume chamber 7 by a separating piston 21. The chamber 7 is connected to the internal cylindrical chamber defined within the sleeve 9 by a narrow conduit 22 adjacent the valve device 8.

The valve device 8 comprises: firstly, a permanently open passage 23 forming a communication between the chamber 6, the chamber 7 and the above-mentioned chamber defined within the sleeve 9; secondly, a controlled valve in the form of a distribution slide valve with an inlet 24 and an outlet 25, the inlet being closed by a piston 26 when the piston is in a rest position to which it is urged by a spring 27; and thirdly a control or metering orifice 28 defined by a throttle constriction of wall portions of the respective components.

The above-described damper operates in the following manner:

When the damper which is shown in FIG. 1 in the rest condition is put under load, the hollow rod 1 and the components which are fixed thereto slide in the cylinder 2, when the value of the load on the damper exceeds a threshold determined by the characteristics of the spring 14 which as mentioned above tends to facilitate the movement of the rod 1 into the cylinder 2. The resulting threshold is greatly lower than that of the above-discussed previously known dampers.

The movement of the rod 1 into the cylinder 2 causes hydraulic fluid to pass from the variable-volume chamber 6 into the low-pressure air chamber 3 through the apertures 11 and 12 and passages 13. At low speeds of movement of the rod 1, fluid also flows from the chamber 6 through the passage 23, into the sleeve 9 and thence into the chamber 3, as soon as the apertures 12 have passed the shoulder 5 (FIG. 2). At high speeds of movement of the rod 1 into the cylinder 2, the flow of hydraulic fluid from the chamber 6 through the throttle orifice 28 gives rise to a pressure drop which produces a pressure difference to which the piston 26 is responsive and which causes the piston 26 to be displaced against the spring 27, thus opening the inlet 24 which is communicated with the outlet 25 to provide a supplementary orifice for the flow of hydraulic fluid from the chamber 6 to the chamber 3.

When the pressure in the chamber 3 has risen to such a point that it is in equilibrium with the pressure in the high-pressure chamber 20 any increase in the loading on the damper results in hydraulic fluid passing from the chamber 6 simultaneously to the chamber 3 and also to the chamber 7 by way of the conduit 22, thereby compressing the air contained in the high-pressure chamber 20 by displacement of the separating piston 21 downwardly in FIG. 2. When the load on the damper is relieved, the hydraulic fluid flows from both the chambers 7 and 3, and then solely from the chamber 3, to the chamber 6, by way of the apertures 11 and 12 and the conduit 22 and, at the valve device 8, by the single passage 23.

In order to reduce or eliminate the destructive effects of an excessively abrupt end to the damper expansion or extension movement, the axial position of the apertures 12 is so selected that, shortly before the end of the damper expansion movement, the apertures 12 are closed by the shoulder 5 and the return of hydraulic fluid to the chamber 6 occurs only by way of the small aperture 11 (see FIG. 3). This therefore provides an effective deceleration action on the rod 1, towards the end of the damper expansion movement.

Figure 4:
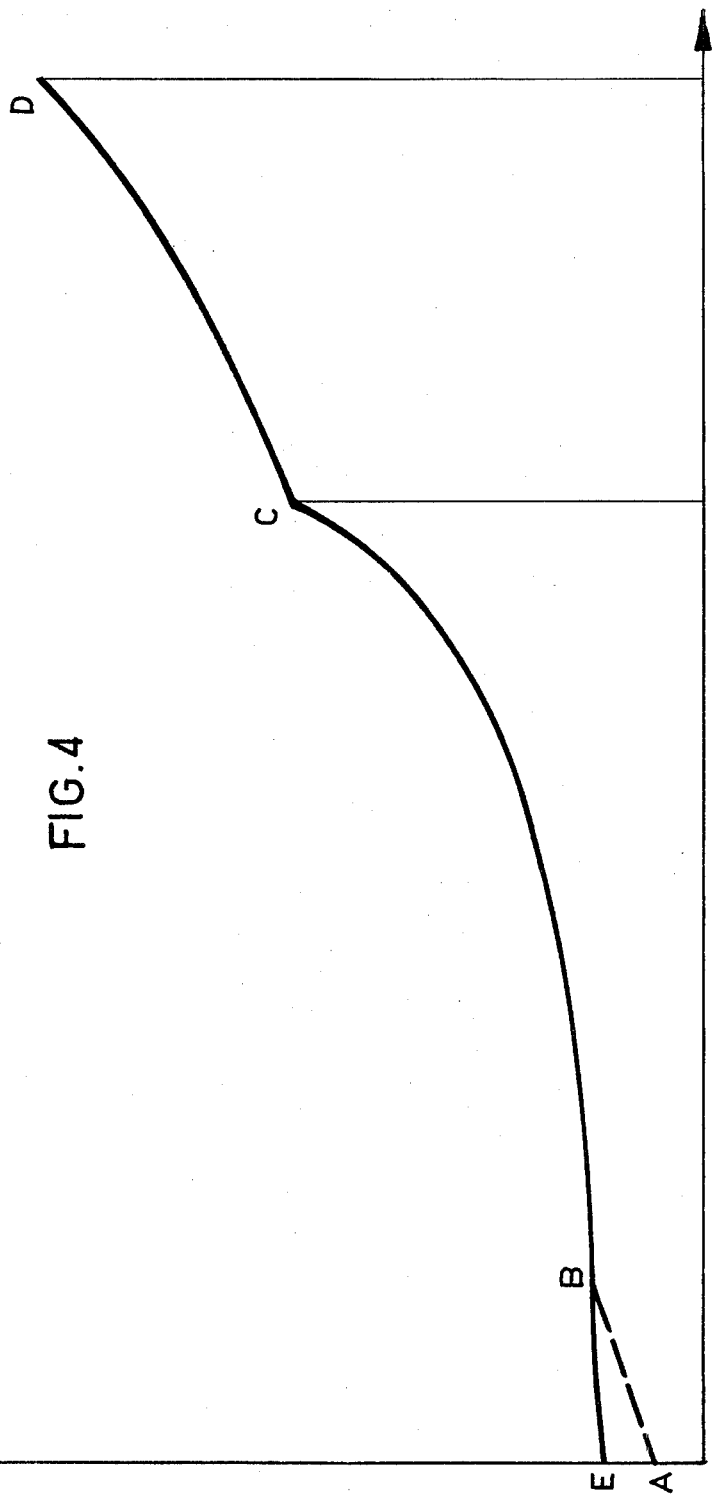
FIG. 4 shows the polytropic curve of the FIG. 1 damper.

In FIG. 4, the curve ABCD represents the polytropic curve of such a damper, the portion AB corresponding to the action of the anti-threshold spring 14, the portion BC corresponding to the rise in pressure in the low-pressure chamber 3, and the portion CD corresponding to the rise in pressure in both the low-pressure and high-pressure chambers 3 and 20. In FIG. 4 also, the curve ECD corresponds to previously known dampers with two air chambers, which have a substantial threshold in respect of leading on the damper.

Finally, as mentioned above, the damper may under some operating conditions assume an inclined position, for example when used in an aircraft undercarriage train. The lateral transfer passages 13 in the external surface of the sleeve 9 permit air which has penetrated into the space occupied by the hydraulic fluid, to rise back into the low-pressure chamber 3 when the damper is returned to the upright position, and similarly allow the hydraulic fluid to return to cover the various operating orifices and apertures, for example in the sleeve 9.

Various modifications may be made without thereby departing from the scope of the present invention as defined by the appended claims.

We claim:

1. An oleo-pneumatic damper comprising: a cylinder; a hollow rod mounted for sliding movement in the cylinder; a low-pressure gas chamber within the cylinder; a first variable volume for hydraulic fluid, provided substantially in the hollow rod and disposed adjacent to the low-pressure gas chamber; a second variable volume for hydraulic fluid, in the hollow rod; a high-pressure gas chamber in the hollow rod; a valve device operatively disposed between said first and second volumes and having a closed position of separating said volumes from each other; and a resilient means disposed in said first fluid volume and operable to urge the hollow rod inwardly of the cylinder whereby the resilient means forms an anti-threshold spring means tending to reduce the minimum loading on the damper at which the damper commences a compression stroke movement for damping purposes.

2. A damper according to claim 1 wherein said valve device comprises a valve which in operation is controlled by the speed of movement of the hollow rod into the cylinder, thereby permitting hydraulic fluid to pass by way of a small retarding orifice at low speeds of rod movement and by way of a supplementary retarding orifice at higher speeds of rod movement.

3. A damper according to claim 2 wherein said valve device comprises a distribution slide valve having an inlet orifice and an outlet orifice, and a piston spring-loaded to a position of closing one of said valve orifices at said low speeds of rod movement, and wherein said valve device further includes a control orifice, flow of hydraulic fluid through said control orifice at high speeds of rod movement causing a pressure drop across the control orifice, the resulting pressure difference displacing said valve piston against its spring-loading to a position of opening said one valve orifice.

4. A damper according to claim 1 wherein a single separating piston is disposed between the high-pressure gas chamber and said second fluid volume whereby the pressures in the low-pressure gas chamber and said first and second fluid volumes act on one face of the piston and the pressure in the high-pressure gas chamber acts on the other face of the piston.

5. A damper according to claim 1 including a sleeve which is disposed in said first fluid volume and which is fixed with respect to the hollow rod, the sleeve having a head end portion capable of engaging by sliding movement into the low-pressure gas chamber and the sleeve also having radial apertures which are disposed adjacent to its head end portion and which are positioned axially of the sleeve in relation to a shoulder which is fixed relative to the cylinder such that some of said apertures are closed by said shoulder towards the end of an expansion movement of the damper, thereby to decelerate the expansion movement towards its end.

6. A damper according to claim 5 wherein the sleeve has axial groove means in its external surface adjacent to said head end portion, co-operation of the groove means and said shoulder defining lateral transfer passages to permit gas to rise back into the low-pressure gas chamber and the hydraulic fluid to return to its said volumes when the damper, after having been inclined, is returned to a substantially vertical position, with the low-pressure gas chamber at the upper part of the damper.

* * * * *